Dec. 25, 1934.   G. H. HUFFERD ET AL   1,985,781
JOINT
Filed March 27, 1933
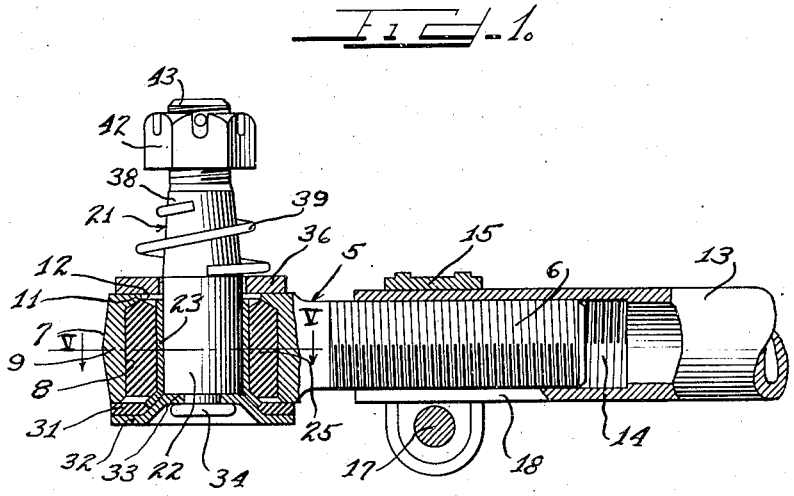
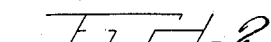
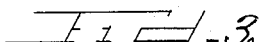
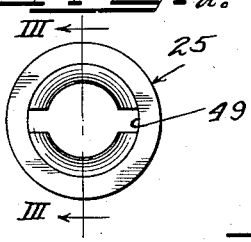
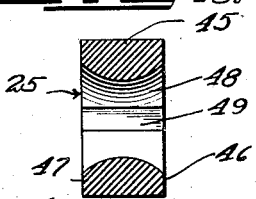
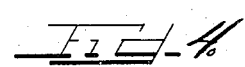
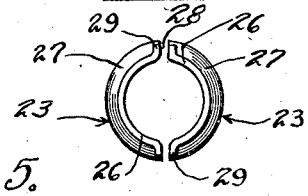
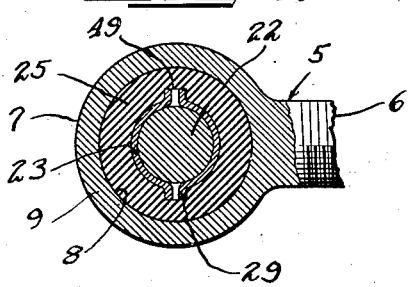
Inventors
George H. Hufferd.
Matthew P. Graham.
by Charles H. Hill, Attys.

Patented Dec. 25, 1934

1,985,781

UNITED STATES PATENT OFFICE 1,985,781

JOINT

George H. Hufferd and Matthew P. Graham, Detroit, Mich., assignors to Thompson Products, Incorporated, Cleveland, Ohio, a corporation of Ohio Application March 27, 1933, Serial No. 662,960

9 Claims. (Cl. 287—85)

This invention relates to an improved joint construction and will be described as incorporated in a device suitable for use in steering mechanisms for automotive vehicles and the like.

An object of this invention is the provision of a joint which is extremely durable and simple in construction and which is automatically self-adjusted to compensate for wear of the relatively movable engaging parts.

Another object is the provision of such a joint wherein a substantially cylindrical resilient packing is employed for exerting a radial compressive force on a bearing element, to maintain it in constant uniform bearing engagement with a body portion of one of the relatively movable joint members, to obviate the necessity of service or manual adjustment.

A further object is the provision of a novel resilient packing element for use in a joint of the kind above identified, in which provision is made for the flowing axially of material of the packing element, when under compression, snugly to embrace one of the joint elements without protruding from the socket and being adapted, when in assembled position, to produce a high stress area at the axial center of the bushing which stress decreases toward the ends of the bushing, to facilitate angular movement of the center line of the stud disposed therein, and to provide necessary resiliency to compensate for wearing of the stud and bushing elements.

Other objects and advantages of this invention will become apparent from the following detail description of the accompanying drawing illustrating a preferred embodiment of the invention.

On the drawing:

Figure 1 is a longitudinal vertical section through a joint incorporating this invention and illustrating portions fragmentarily and in elevation.

Figure 2 is a plan view of a resilient bushing or packing element incorporated in this invention.

Figure 3 is a vertical section taken on the line III—III of Figure 2.

Figure 4 is a plan view of a bushing employed in the construction of Figure 1.

Figure 5 is a fragmentary section taken on the line V—V of Figure 1.

As shown on the drawing:

The construction illustrated in Figure 1 comprises a socket element 5 preferably of forged metal and including a threaded shank 6 at one end and a housing 7 at the other end in which is formed a cylindrical socket 8 defined by the wall 9 of the housing 7. The housing is also provided with an inwardly extending flange or wall 11 for restricting the upper side of the socket and providing an opening 12 therethrough.

To the shank 6 may be secured a connecting arm 13 which is threaded internally adjacent the end toward the joint as indicated at 14 to provide for adjustment relative to the shank 6. Suitable means such as a clamp element 15 may embrace the arm 13 adjacent the ends and be held in position by a clamping bolt 17. The end portion of the arm 13 is preferably provided with a slot 18 to permit yielding of the threaded portion when under pressure of the clamp 15. A stud 21 comprising an element of the joint adapted for limited universal movement relative to the socket element 5 and includes a cylindrical body portion 22 extending through the socket 8 and embraced by bearings 23 with which it has bearing engagement, the bearing 23 preferably being formed of metal impregnated with graphite to make a self lubricating bearing. The engagement between the body portion 22 of the stud and the bearings 23 is maintained substantially constant by a resilient bushing 25 held under compression between the bearings 23 and the wall of the socket 8. Each bearing sleeve 23 is preferably provided with a semi-cylindrical bearing portion 26 and an outwardly flared base flange 27, also with axially extending flanges 29 which fit in grooves 49 in the bushing 25. The bearings are preferably spaced as indicated at 28 in Figure 4, to permit the same to be forced into constant bearing contact with the stud 21 as the surfaces of the bearings 23 and the stud 21 gradually wear away.

The lower end of the socket 8 is preferably closed by a resilient washer 31 confined between the lower edge of the wall 9 and a plate 32 mounted on the lower portion of the stud 21. The plate 32 is preferably offset upwardly adjacent the center and includes a flanged portion 33 confined between the body portion 22 of the stud and an integral button on the extreme lower end of the stud 21. The button 34 is sufficiently thin that it is wholly disposed above the lower surface of the plate 32 so as to obviate the possibility of its catching on articles over which it may pass.

The upper side of the socket is preferably closed by a washer 36 seated on the flange 11 and loosely surrounding the stud 21. The intermediate portion of the stud may be tapered as indicated at 38 upon which may be confined any suitable arm or element not shown. A coil spring 39 is normally seated on the washer 36. It will be understood that the coil spring 39, when the joint is in use, would be confined between the washer 36 and such element or arm as might be secured on the tapered portion 38 of the stud 21 by means of the nut 42 on the upper thread portion 43 of the stud.

The resilient bushing 25 before being inserted in socket 8, is preferably of the form illustrated in Figures 2 and 3, having a cylindrical outer surface 45 and parallel plane surfaces 46 and 47. The bushing is provided with a relatively large opening therethrough formed such that the inwardly disposed surface 48 is convex to provide excess material which, when the bushing is installed under compression, flows axially toward the edges of the convex portion and is there reserved for the purpose of partially flowing back to its normal position as necessitated to maintain the bearings 23 in constant contact with the body portion 22 of the stud 21, as the engaging surfaces of the bearings 23 and the portion 22 slowly wear away when in use. The construction is such that protrusion of the bushing 25 axially from the stud 21 is obviated and a constant reserve of resilient pressure is maintained about the bearings 23.

The bore through the bushing 25 is axially convex, being smallest adjacent the center and relieved adjacent the ends such that when assembled in the combination shown in Figure 1, the inner surface of the bushing becomes cylindrical as a result of the flowing of material of the inner convex portion of the bushing axially into the spaces provided by the enlarged bore adjacent the ends of the bushing. The channel shaped slots 49 are provided for the flanges 29 to prevent rotation of the bearings 23 relative to the bushing 25.

Although sufficient flow and deformation takes place to permit insertion of the sleeve 23 without causing protrusion of the material of the bushing beyond the normal ends of the bushing, the pressure of the bushing 25 on the sleeve 23 is greatest adjacent the mid-point axially of the bushing and gradually fading out toward the ends because of the original inwardly convex shape. This condition of greatest pressure at the center and less pressure adjacent the ends, facilitates rocking or limited universal movement of the stud 22 relative to the socket element 5. Also in such rocking movement, the bearings 23 are maintained in snug bearing engagement with the stud because of the constant flowing and reflowing of the material of the bushing, from its original position by pressure exerted by the bearings 23 and toward its original position as the movement of the stud and sleeve leaves space for such reflowing.

It has been found from extensive experimentation that such a bushing, in order to perform its function properly, should preferably be compounded of new rubber with such ingredients as will produce the required physical characteristics. The rubber should be of non-blooming stock. It should be very homogeneous and be cured such that the hardness will be uniform. It must be very resistant to tearing after slitting in either direction of the grain, smooth and free from folds or laps or any other imperfection.

The stock must be so compounded that it will have a maximum possible resistance to permanent set. Such, for instance, when a washer formed of the stock, ¼th-inch thick, taken from the center of the bushing is compressed under a pressure of 600 lbs. per square inch at a temperature of 158° F. for a period of 24 hours, the permanent set measured within 30 minutes after the pressure has been released should not exceed 15%.

The stock should also be such that the hardness will be equivalent to a reading of 55–65 on a Shore Durometer and should not increase abnormally at sub-zero temperatures. A bushing of this type, as incorporated in the invention illustrated in Figure 1, is very effective in maintaining the bearings 23 very snugly on the body portion 22 of the stud without causing abnormal frictional pressure and being capable of considerable flow of the rubber bushing to compensate for wear of the parts without greatly changing the pressure by which the bearings 23 are held in position. Such a construction, as assembled as shown in Figure 1, is very durable and capable of extensive use without the necessity of repair, replacement or adjustment of parts.

From the foregoing description, it will be appreciated that this invention is susceptible of various changes and modifications without departing from the principles thereof, and it is desired that the patent to be granted hereon shall not be restricted in any manner except as necessitated by the prior art.

We claim as our invention:

1. In a joint, a socket member including a housing portion having a cylindrical socket therein open at one end, an inwardly extending radial flange on said housing partially closing the other end of the socket, a stud adapted for limited universal movement relative to said socket member and comprising a cylindrical portion disposed within the socket, closure means on said stud for closing the open end of said socket, a metallic bearing fitted on the portion of said stud within said socket, and a resilient bushing disposed under radial compression between said bearing and the inner surface of the socket, said bushing comprising rubber and having an opening bounded by an inwardly convex portion to facilitate the flow of material of the bushing axially along the stud and produce a portion of maximum stress adjacent the mid-point axially of the bushing, decreasing toward the ends.

2. In a joint, a socket member including a housing portion having a cylindrical socket therein open at one end, an inwardly extending radial flange on said housing partially closing the other end of the socket, a stud adapted for limited universal movement relative to said socket member and comprising a cylindrical portion disposed within the socket, closure means on said stud for closing the open end of the socket, metallic bearings fitted on the portion of said stud within said socket, axially extending flanges on said bearings, and a resilient bushing disposed under radial compression between said bearings and the inner surface of the socket, said bushing comprising rubber and having an axially extending channel-shaped recess to provide space for the flanges on said bearings, said bushing comprising inwardly convex portions engaging said bearings to produce portions of greatest stress adjacent the mid-point axially of the bushing to facilitate rocking movement of the stud relative to the socket member.

3. In a joint, a socket member including a housing having a cylindrical socket therein open at one end, an inwardly extending radial flange on said housing partially closing the other end of the socket, a stud adapted for limited universal movement relative to said socket member and comprising a cylindrical portion disposed within the socket, means for yieldingly restraining axial movement of said stud relative to the socket, a two-piece metallic bearing on the portion of the stud within the socket, and a resilient bushing disposed under radial pressure between said bearing and the inner surface of the socket, for maintaining the bearing in snug engagement with the stud to automatically compensate for wear of the engaging surfaces of the stud and bearing, said bushing comprising rubber and including an axially convex portion deformed by engagement with the bearing and held under radial compression to produce a portion of maximum stress substantially at the axial center point of the bushing to facilitate universal movement within the joint.

4. In a joint, a socket member including a housing portion having a socket therein open at the lower end, said housing having an opening therein communicating with the upper end of the socket, a stud including a bearing portion extending into said socket, metallic bearing members embracing said bearing portion and adapted for sliding movement thereon, and a deformable resilient annular bushing disposed within the socket, tightly embracing said bearing members and engaging the inner surface of the socket for constantly maintaining the bearing members in snug engagement with said bearing portion to compensate for wear, while permitting limited universal movement of said stud relative to said socket member, said bushing comprising rubber and having an axially extending bore of restricted diameter at the axial mid-point gradually increasing toward the ends to provide space for axial flowing of material of the bushing along the bearing members.

5. A bushing for a joint of the class described comprising a rubber ring having an outer cylindrical surface, said ring comprising an axial bore with an inwardly extending portion convex axially, said bushing having a plurality of axially extending recesses disposed to receive parts of a bearing over which the bushing is adapted to fit to prevent relative rotation between the bushing and such a bearing.

6. A bushing for a joint of the class described comprising a rubber ring having an outer cylindrical surface, said ring comprising an inwardly extending portion convex axially, said bushing having a plurality of axially extending channel-shaped recesses dividing the convex portion into a plurality of sectors to provide space for interlocking engagement with portions of a bearing element.

7. A bushing for a joint of the class described comprising a rubber member having an opening therethrough for the reception of a stud, said member comprising an inwardly extending portion convex axially, said bushing having recesses through the convex portion to provide for interlocking engagement with a bearing element and restrain relative rotation.

8. In a joint, a socket member including a housing having a cylindrical socket therein open at one end, an inwardly extending radial flange on said housing partially closing the other end of the socket, a stud adapted for limited universal movement relative to said socket member and comprising a cylindrical portion disposed within the socket, means for yieldingly restraining axial movement of said stud relative to the socket, a contractible metallic bearing on the portion of the stud within the socket, said bearing including anchoring flanges and a resilient bushing disposed under radial pressure between said bearing and the inner surface of the socket, for contracting the bearing into snug engagement with the stud to automatically compensate for wear of the engaging surfaces of the stud and bearing, said bushing comprising a rubber member having a form to fit within the socket and having a bore therethrough in which said sleeve is disposed, the bore being of such shape that when in assembled position the pressure on the sleeve is greatest adjacent the center and least adjacent the ends, thereby facilitating limited universal movement of the stud and sleeve relative to the socket element, said bushing also having axially extending recesses to receive said anchoring flanges and prevent relative rotation of the bearing and the bushing.

9. In a joint, a housing providing a socket having an inturned flange at one end thereof defining an aperture, a stud extending freely through said aperture and having a cylindrical bearing surface in said housing, a pair of segmental cylindrical bearing members substantially totally enveloping said stud bearing surface in bearing relation therewith and having turned out flanges at the edges thereof in spaced opposed relation, additional sloping flanges extending outwardly from the bottom of said bearing members, a resilient bushing disposed under radial compression in said housing engaging said bearing members and having inwardly convex portions to produce portions of greatest stress adjacent the mid-point axially of the bushing to facilitate tilting movement of the stud relative to the housing, grooves in said bushing for receiving the flanges on the edges of the bearing members to lock the same against rotation, and a closure plate having a depressed portion defined by sloping walls secured to the end of the stud, said sloping walls abutting the sloping flanges of the bearing to hold said bearing in said housing.

GEORGE H. HUFFERD.
MATTHEW P. GRAHAM.